(12) United States Patent
Zysman

(10) Patent No.: US 10,557,416 B2
(45) Date of Patent: Feb. 11, 2020

(54) FLOW MODULATING AIRFOIL APPARATUS

(71) Applicant: United Technologies Corporation, Farmington, CT (US)

(72) Inventor: Steven H. Zysman, Amston, CT (US)

(73) Assignee: United Technologies Corporation, Farmington, CT (US)

(*) Notice: Subject to any disclaimer, the term of this patent is extended or adjusted under 35 U.S.C. 154(b) by 257 days.

(21) Appl. No.: 15/620,284

(22) Filed: Jun. 12, 2017

(65) Prior Publication Data

US 2018/0355739 A1    Dec. 13, 2018

(51) Int. Cl.
| F01D 9/06 | (2006.01) |
| F02C 3/04 | (2006.01) |
| F02K 3/06 | (2006.01) |
| F02C 7/18 | (2006.01) |
| F24F 13/10 | (2006.01) |

(Continued)

(52) U.S. Cl.
CPC ............ *F02C 7/185* (2013.01); *F01D 17/148* (2013.01); *F01D 25/12* (2013.01); *F02C 6/08* (2013.01); *F02C 7/14* (2013.01); *F02K 3/06* (2013.01); *F02K 3/115* (2013.01); *F16K 1/2007* (2013.01); *F16K 1/2021* (2013.01); *F24F 13/10* (2013.01); *F24F 13/1486* (2013.01); *F05D 2260/213* (2013.01); *F24F 2013/1433* (2013.01); *Y10T 137/87467* (2015.04)

(58) Field of Classification Search
CPC .... F02C 7/185; F02C 6/08; F02C 7/14; F01D 17/148; F01D 25/12; F02K 3/06; F02K 3/115; F16K 1/2007; F16K 1/2021; F24F 13/10; F24F 13/1486; F24F 2013/1433; F05D 2260/213; F05D 260/213; Y10T 137/87483; Y10T 137/87467
USPC ........................................................... 60/806
See application file for complete search history.

(56) References Cited

U.S. PATENT DOCUMENTS

| 1,568,410 | A |   | 1/1926 | Minter |
| 3,125,944 | A | * | 3/1964 | Radcliff ................. F24F 13/15 454/315 |

(Continued)

FOREIGN PATENT DOCUMENTS

| EP | 2759476 A2 | 7/2014 |
| EP | 3115588 A1 | 1/2017 |
| FR | 1597532 A  | 6/1970 |

OTHER PUBLICATIONS

Partial European Search Report for EP Application No. 181755695, dated Oct. 11, 2018, 13 pages.

(Continued)

*Primary Examiner* — Steven M Sutherland
*Assistant Examiner* — Alexandru A. Herescu
(74) *Attorney, Agent, or Firm* — Kinney & Lange, P.A.

(57) ABSTRACT

A gas turbine engine includes a fan, a compressor, a combustor, a turbine, a bypass duct downstream of the fan and outward of the compressor, and a cooling system. The cooling system includes an inlet for receiving air from the bypass duct, an outlet for returning air to the bypass duct, a cooling duct, and a heat exchanger and a modulator positioned in the cooling duct. The modulator includes dividers that extend parallel to each other and are arranged across the duct, and each divider includes two flaps that are rotatable about an axis in opposite directions.

20 Claims, 5 Drawing Sheets

(51) Int. Cl.
*F02C 7/14* (2006.01)
*F01D 17/14* (2006.01)
*F02C 6/08* (2006.01)
*F16K 1/20* (2006.01)
*F01D 25/12* (2006.01)
*F24F 13/14* (2006.01)
*F02K 3/115* (2006.01)

(56) References Cited

U.S. PATENT DOCUMENTS

| | | | | |
|---|---|---|---|---|
| 3,593,645 | A | * | 7/1971 | Day .................. F24F 13/10 454/315 |
| 4,147,029 | A | * | 4/1979 | Sargisson ............ F02C 7/042 137/15.1 |
| 5,319,927 | A | | 6/1994 | Maguire |
| 7,823,389 | B2 | * | 11/2010 | Seitzer ................ F01D 11/24 60/782 |
| 8,490,382 | B2 | | 7/2013 | Zysman et al. |
| 9,108,737 | B2 | | 8/2015 | Zysman et al. |
| 9,206,912 | B2 | * | 12/2015 | Landre ................ F16K 3/30 |
| 2009/0175718 | A1 | * | 7/2009 | Diaz ................... F01D 25/12 415/180 |
| 2015/0198092 | A1 | | 7/2015 | Weiner |
| 2016/0024964 | A1 | | 1/2016 | Weiner |
| 2016/0153363 | A1 | | 6/2016 | Zysman et al. |

OTHER PUBLICATIONS

Extended European Search Report for EP Application No. 18175569.5, dated Feb. 20, 2019, 14 pages.

* cited by examiner

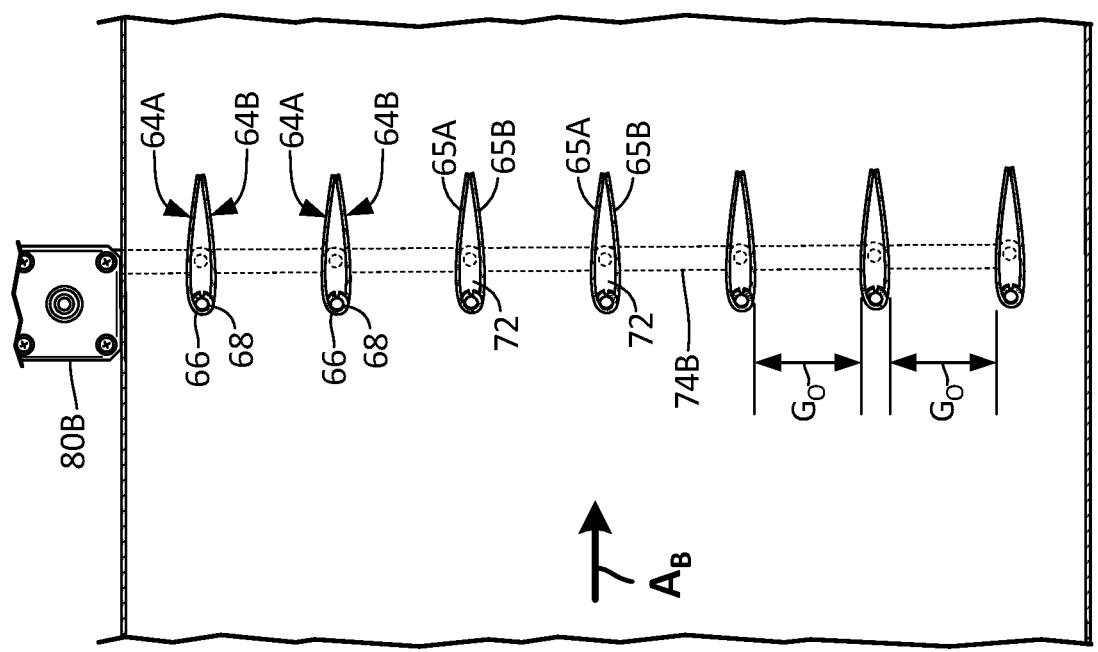

FLOW MODULATING AIRFOIL APPARATUS

BACKGROUND

The present invention relates generally to fluid systems, and more particularly to a flow modulating airfoil apparatus for an aircraft engine cooling system.

There are a variety of known gas turbine engine configurations, including two-spool, high-bypass engines. Such an engine typically includes a high pressure spool, a combustion system and a low pressure spool disposed within an engine case to form a generally axial, serial flow path about the engine centerline. The high pressure spool includes a high pressure turbine, a high pressure shaft extending axially forward from the high pressure turbine, and a high pressure compressor connected to a forward end of the high pressure shaft. The low pressure spool includes a low pressure turbine, which is disposed downstream of the high pressure turbine, a low pressure shaft, which typically extends coaxially through the high pressure shaft, and a low pressure compressor connected to a forward end of the low pressure shaft, forward of the high pressure compressor. A fan is also connected to the low pressure spool, forward of the low pressure compressor. The combustion system is disposed between the high pressure compressor and the high pressure turbine and receives compressed air from the compressors and fuel provided by a fuel injection system. A combustion process is carried out within the combustion system to produce high energy exhaust gases to produce thrust and turn the high and low pressure turbines, which drive their respective compressors and the fan to sustain the combustion process.

The rotation of the fan produces bypass air (i.e., air that is not used in the combustion process) that provides a major portion of the thrust in a high-bypass engine. The temperature of the bypass airflow is relatively cool compared to the engine components, so it is used as an engine cooling source. For example, a portion of the bypass airflow is bled at an upstream location into a cooling passage within the engine compartment and used to absorb heat from engine components. The cooling passage discharges the bleed flow at a downstream location back into the bypass airflow.

Two trends in new jet engine technology include geared turbofan systems and replacement of pneumatic systems with electrical systems. Such equipment can produce more heat than traditional gas turbine engine systems, so the cooling systems have increased in capacity accordingly. However, the amount of cooling required is dependent on the condition that the engine is operating in (e.g., ground idle, take-off, cruising, landing, etc.). Although effective for cooling, using the bleed flow for cooling reduces the thrust efficiency of the engine. Furthermore, in certain operating conditions, the bleed flow can cause excess cooling if left unchecked. Therefore, the amount of bleed flow being taken from the bypass airflow should be the smallest amount that provides adequate cooling during all of the engine operating conditions.

SUMMARY

According to one embodiment, a gas turbine engine includes a fan, a compressor, a combustor, a turbine, a bypass duct downstream of the fan and outward of the compressor, and a cooling system. The cooling system includes an inlet for receiving air from the bypass duct, an outlet for returning air to the bypass duct, a cooling duct, and a heat exchanger and a modulator positioned in the cooling duct. The modulator includes dividers that extend parallel to each other and are arranged across the duct, and each divider includes two flaps that are rotatable about an axis in opposite directions.

According to another embodiment, a fluid modulator includes dividers that extend parallel to each other and are arranged across a duct. Each divider includes two flaps and a pin, with each flap including a knuckle and a leaf extending downstream. The pin extends through the knuckles and provides an axis of rotation for the flaps.

BRIEF DESCRIPTION OF THE DRAWINGS

FIG. 2B is a top cross-sectional view of the modulator in the fully-open state along line 2-2 in FIG. 2A.

DETAILED DESCRIPTION

Figure 1:
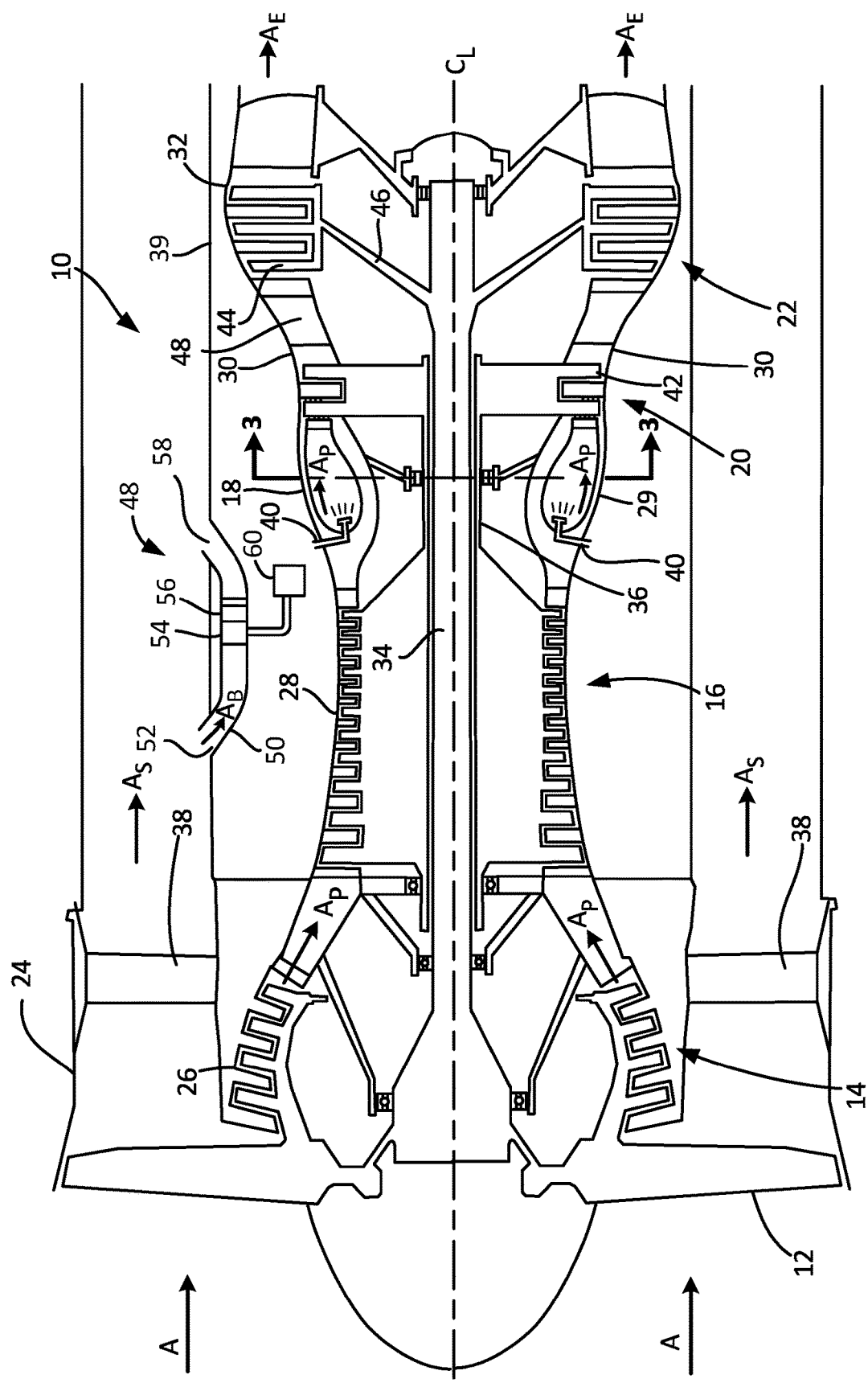
FIG. 1 is a schematic cross-sectional view of a gas turbine engine including a cooling system.

FIG. 1 is a schematic side cross-sectional view of gas turbine engine 10 for an aircraft (not shown). Shown in FIG. 1 are gas turbine engine 10, fan 12, low pressure compressor (LPC) 14, high pressure compressor (HPC) 16, combustor section 18, high pressure turbine (HPT) 20, low pressure turbine (LPT) 22, bypass duct outer wall 24, LPC case 26, HPC case 28, combustor case 29, HPT case 30, LPT case 32, low pressure shaft 34, high pressure shaft 36, fan exit guide vanes 38, bypass duct inner wall 39, fuel injectors 40, HPT blades 42, LPT blades 44, support rotor 46, cooling system 48, duct 50, inlet 52, heat exchanger 54, modulator 56, outlet 58, component 60, inlet air A, bleed air $A_B$, exhaust air $A_E$, primary air $A_P$, secondary air $A_S$ (also known as bypass air), and longitudinal engine centerline axis $C_L$.

In the illustrated embodiment, gas turbine engine 10 comprises a dual-spool turbofan engine, although other engine configurations are possible in alternative embodiments. Gas turbine engine 10, of which the operational principles are well known in the art, comprises fan 12, LPC 14, HPC 16, combustor section 18, HPT 20, and LPT 22, which are each concentrically disposed around longitudinal engine centerline axis $C_L$. Fan 12 is enclosed at its outer diameter within bypass duct outer wall 24. Likewise, the other engine components are correspondingly enclosed at their outer diameters within various engine casings, including LPC case 26, HPC case 28, combustor case 29, HPT case 30, and LPT case 32. Fan 12 and LPC 14 are connected to LPT 22 through low pressure shaft 34, and together with fan 12, LPC 14, LPT 22, and low pressure shaft 34 comprise the low pressure spool. HPC 16 is connected to HPT 20 through high pressure shaft 36, and together HPC 16, HPT 20, and high pressure shaft 36 comprise the high pressure spool.

During normal operation, inlet air A enters engine 10 where it is divided into streams of primary air $A_P$ and secondary air $A_S$ after passing through fan 12. Fan 12 is rotated by LPT 22 through low pressure shaft 34 (either directly as shown or through a gearbox, not shown) to accelerate secondary air $A_S$ (also known as bypass air) through fan exit guide vanes 38 and between bypass duct outer wall 24 and bypass duct inner wall 39, thereby producing a major portion of the thrust output of engine 10.

Primary air $A_P$ (also known as gas path air) is directed first into LPC 14 and then into HPC 16. LPC 14 and HPC 16 work together to incrementally increase the pressure of primary air $A_P$. HPC 16 is rotated by HPT 20 through high pressure shaft 36 to provide primary air $A_P$ to combustor section 18. The compressed air is delivered to combustor section 18, along with fuel through fuel injectors 40, such that this fuel-air mixture is ignited by ignitors (not shown) thus resulting in a combustion process which can be carried out to produce the high energy gases necessary to turn HPT 20 and LPT 22. These high energy gases continue through gas turbine engine 10 whereby they are typically passed through an exhaust nozzle (not shown) to further produce thrust.

After being compressed in LPC 14 and HPC 16 and participating in a combustion process in combustor section 18 to increase pressure and energy, primary air $A_P$ is mixed with fuel in the combustor section 18. This fuel-air mixture is ignited by ignitors (not shown) and burned in the combustor section 18 producing exhaust air $A_E$. Exhaust air $A_E$ flows through HPT 20 and LPT 22 such that HPT blades 42 and LPT blades 44 extract energy from the flow of exhaust air $A_E$. Exhaust air $A_E$ impinges on HPT blades 42 to cause rotation of high pressure shaft 36, which turns HPC 16. Exhaust air $A_E$ also impinges on LPT blades 44 to cause rotation of support rotor 46 and low pressure shaft 34, which turns fan 12 and LPC 14.

In order to provide cooling for some of the components of gas turbine engine 10, cooling system 48 is positioned between HPC case 28 and bypass duct inner wall 39. In the illustrated embodiment, cooling system 48 includes duct 50 with inlet 52, heat exchanger 54, modulator 56, and outlet 58. During the operation of fan 12, a portion of secondary air $A_S$ enters inlet 52 and becomes bleed air $A_B$. For example, bleed air $A_B$ can be up to 2% of secondary air $A_S$, and the exact amount depends partly upon the state of modulator 56 which is a flow control valve that will be discussed in greater detail with respect to FIGS. 2A-3B. The temperature of bleed air $A_B$ is generally cooler than the temperature of components, systems, and lubricants within gas turbine engine 10, so bleed air $A_B$ is used as the fluid on the cold side of heat exchanger 54. After passing through heat exchanger 54 and modulator 56, bleed air $A_B$ exits cooling system 48 through outlet 58 and rejoins secondary air $A_S$.

In one embodiment, heat exchanger 54 has a tube and fin configuration, although heat exchanger 54 can be another type of heat exchanger. The hot side of heat exchanger 54 has another heat transfer fluid (not shown) flowing through it, for example, oil, which circulates between heat exchanger 54 and component 60. Component 60 can be one of many components and/or systems of gas turbine engine 10, for example, a gearbox, an electric generator, or a whole-engine cooling system. During operation of gas turbine engine 10, the heat transfer fluid absorbs heat from component 60 which is then brought to heat exchanger 54. There, the heat is transferred to bleed air $A_B$, cooling the heat transfer fluid which returns to component 60. Bleed air $A_B$ then removes the heat from cooling system 48 by flowing out of outlet 58 and eventually out of gas turbine engine 10 entirely. Thereby maintaining component 60 at the proper temperature and allowing gas turbine engine 10 to function properly.

Depicted in FIG. 1 is one embodiment of the present invention, to which there are alternative embodiments. For example, engine 10 can be a three spool engine. In such an embodiment, engine 10 has an intermediate pressure compressor (IPC) between LPC 14 and HPC 16 and an intermediate pressure turbine (IPT) between HPT 20 and LPT 22, wherein the intermediate compressor is connected to the intermediate turbine with an additional intermediate shaft such that low pressure shaft, intermediate shaft and high pressure shaft are each concentrically and coaxially disposed around longitudinal engine centerline axis $C_L$.

Figure 2A:
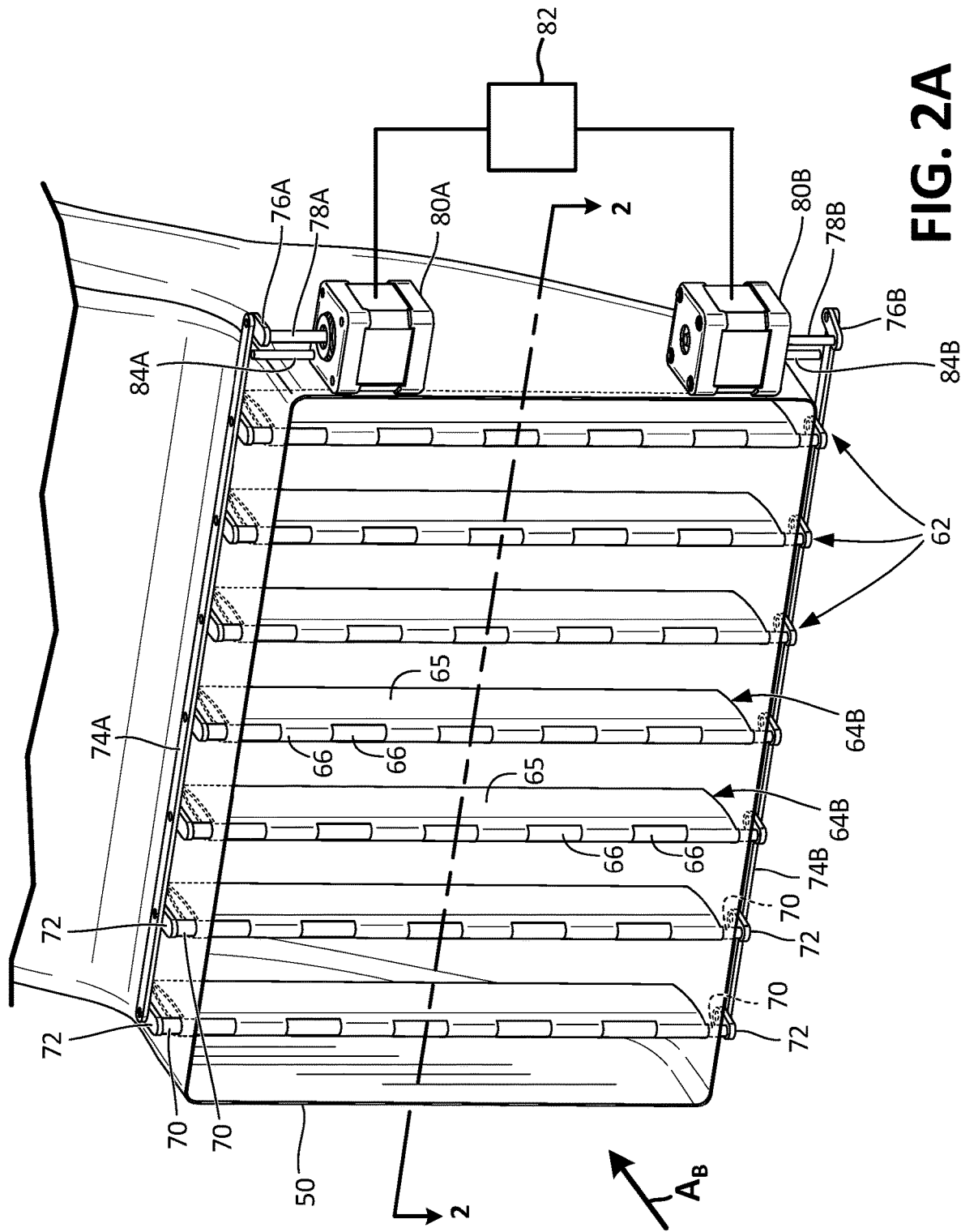
FIG. 2A is a perspective, broken-out view of a modulator of the cooling system of FIG. 1 in a fully-open state.

FIG. 2A is a perspective, broken-out view of modulator 56 in a fully-open state. FIG. 2B is a top cross-sectional view of modulator 56 in the fully-open state along line 2-2 in FIG. 2A. FIGS. 2A and 2B will now be discussed simultaneously.

In the illustrated embodiment, modulator 56 includes a plurality of dividers 62 extend across substantially the entirety of rectangular duct 50, parallel to and spaced apart from one another. Each divider 62 is comprised of two flaps 64A and 64B. In the fully open state, each divider 62 has an airfoil-shape in that the thickness across the flow of bleed air $A_B$ is both tapered and substantially smaller than the length along the flow of bleed air $A_B$. In such a state, the gap GO between adjacent dividers 62 is maximized and modulator 56 has the maximum amount of effective flow area possible. Thereby modulator 56 allows the maximum amount of flow of bleed air $A_B$ that is possible under the given operating conditions.

Each flap 64A has the same configuration as each flap 64B, although flaps 64B have an upside-down orientation compared to flaps 64A. Each of flaps 64A and 64B has a leaf 65A and 65B, respectively, and plurality of knuckles 66. Leaves 65A and 65B are responsible for the variable aerodynamic properties of each divider 62, and knuckles 66 form the leading edge of each divider 62 and also form a barrel into which a pin 68 is placed. Pin 68 links each pair of flaps 64A and 64B together and provides an axis around which both flaps 64A and 64B pivot. Each of flaps 64A and 64B includes a stem 70 which extends through duct 50, although the stems 70 for flaps 64B extend through the opposite side of the duct from the stems 70 for flaps 64A. At the end of each stem 70 is a tab 72 that extends away from the axis of pin 68. In the illustrated embodiment, each pin 68 includes a head that has a slightly enlarged head that is the same or larger diameter than the hole through tab 72. Each pin 68 is pressed into a tab 72 on flap 64A to secure pin 68, although alternative arrangements can be implemented, for example, a perpendicular cross-pin through pin 68 and stem 70.

Each of the tabs 72 for flaps 64A are rotatably connected to a linkage 74A, and each of the tabs 72 for flaps 64B are rotatably connected to a linkage 74B. Linkage 74A is rotatably connected to tab 76A of motor shaft 78A, and linkage 74B is rotatably connected to tab 76B of motor shaft 78B. In the illustrated embodiment, motor shaft 78A is connected to the rotor (not shown) of electric stepper motor 80A, and motor shaft 78B is connected to the rotor (not shown) of electric stepper motor 80B. Electric stepper motors 80A and 80B are powered and controlled by controller 82 which can be a full authority digital electronics control (FADEC).

Figure 3A:
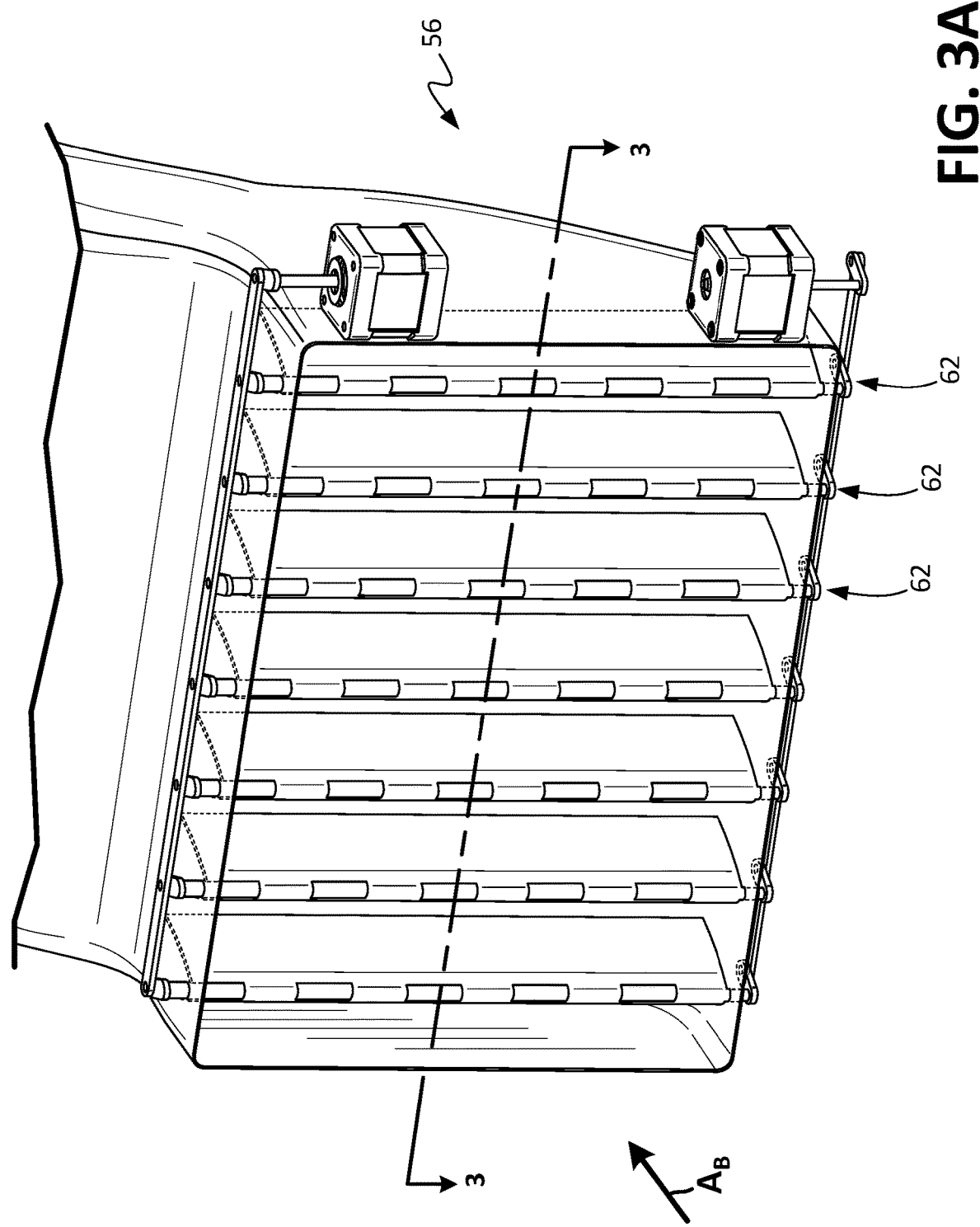
FIG. 3A is a perspective, broken-out view of the modulator in a partially-closed state.
Figure 3B:
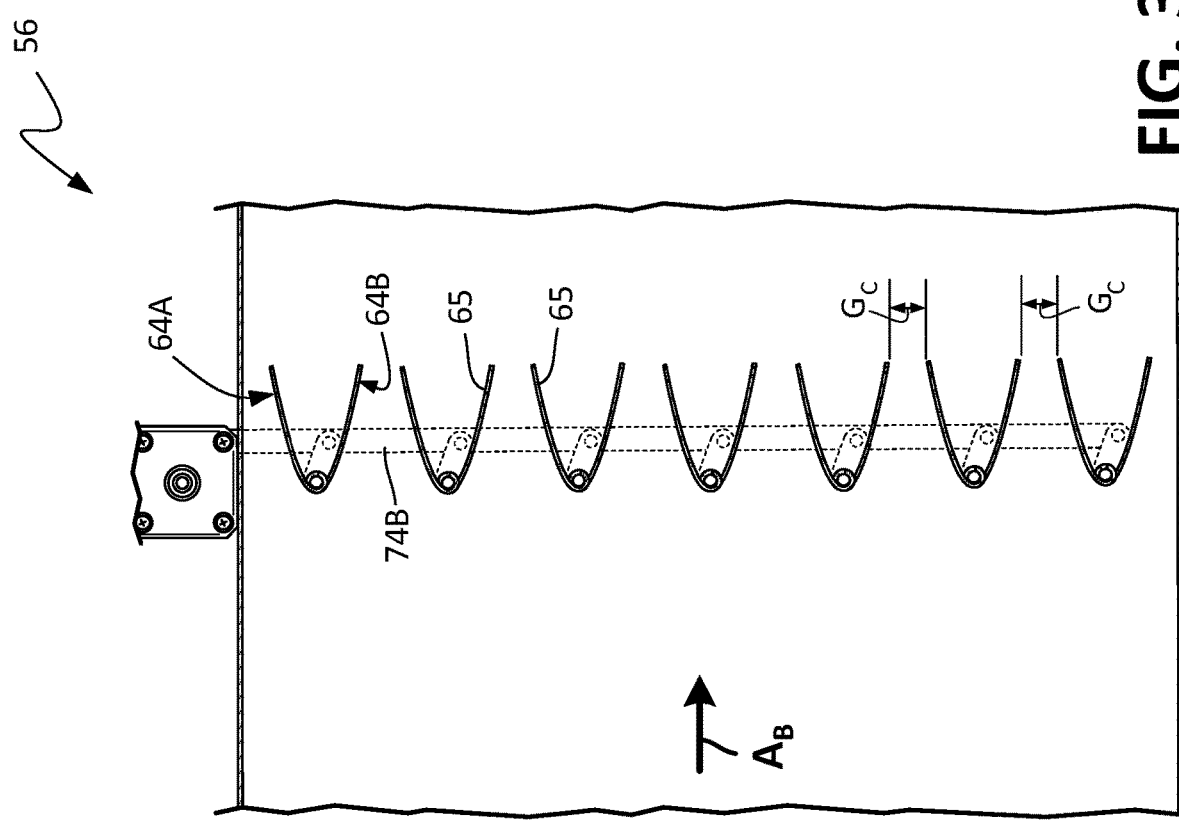
FIG. 3B is a top cross-sectional view of the modulator in the partially-closed state along line 3-3 in FIG. 3A.

FIG. 3A is a perspective, broken-out view of modulator 56 in a partially-closed state. FIG. 3B is a top cross-sectional view of modulator 56 in the partially-closed state along line 3-3 in FIG. 3A. FIGS. 3A and 3B will now be discussed simultaneously, and they can be used in conjunction with FIGS. 2A and 2B to demonstrate how modulator 56 operates.

Controller 82 can cause electric stepper motors 80A and 80B to rotate a specific and equal amount in opposite directions, which turns motor shafts 78A and 78B and tabs 76A and 76B. This movement causes linkages 74A and 74B to move perpendicular to duct 50 in opposite directions, which rotates flaps 64A and 64B about pins 68, respectively, in opposite directions. Therefore, in each pair of flaps 64A and 64B, the trailing edge of leaf 65A moves from being in contact with the trailing edge of leaf 65B to being spaced apart therefrom.

The result is that each divider 62 expands and becomes V-shaped, which shortens the gap $G_C$ between adjacent dividers 62 and lessens the effective flow area of duct 50 at modulator 56. This inhibits the flow of bleed air $A_B$, which reduces the amount of cooling performed by heat exchanger 54 (shown in FIG. 1). There can be a very large amount of degrees to which modulator 56 can be partially closed, and which position is selected in a given situation can be determined by the temperature of the hot fluid in heat exchanger 54 which is known by controller 82. Because heat exchanger 54 will require at least some amount of bleed air $A_B$ during operation of gas turbine engine 10 (shown in FIG. 1), electric stepper motors 80A and 80B include mechanical stops 84A and 84B, respectively, to limit the rotation of tabs 76A and 76B such that modulator 56 cannot be fully closed.

The components and configuration of modulator 56 as shown in FIGS. 2A-3B allow modulator 56 to be controlled in a manner that prevents unnecessary flow of bleed air $A_B$ during conditions when less cooling is needed (e.g., cruising at high altitude) while still providing sufficient bleed air $A_B$ during conditions that require maximum cooling (e.g., take off in a high temperature environment). This occurs with minimal disturbance of bleed air $A_B$ through heat exchanger 54 (shown in FIG. 1) because modulator 56 is positioned downstream of heat exchanger 54, bleed air $A_B$ still flows generally axially and evenly through duct 50 when modulator 56 is in the partially-closed state, and flaps 64A and 64B move symmetrically together to prevent swirling (i.e., modulator 56 provides a substantially uniform blockage of duct 50 when in the partially-closed state). When modulator 56 is in the fully-open state, the airfoil-shape of dividers 62 minimizes the flow loss through modulator in an effort to make it aerodynamically invisible. In addition, in case of power loss to electric stepper motors 80A and 80B, modulator 56 would be forced by bleed air $A_B$ into the fully-open state, ensuring that sufficient cooling is possible.

Depicted in FIGS. 2A-3B is one embodiment of the present invention, to which there are alternatives. For example, there can be greater or fewer dividers 62 than seven. The number and size of dividers 62 can depend on several factors such as, for example, the overall length of duct 50 (because more available length allows for longer leaves 65A and 65B, reducing the required number of dividers 62), the distance between heat exchanger 54 and modulator 56 (because the shorter this distance, the greater number of dividers 62 needed to provide uniform blockage), the difference between the maximum and minimum flow of bleed air $A_B$ (because a smaller difference requires a less restrictive gap $G_C$, permitting larger distances between dividers 62), and the aspect ratio of dividers 62 when in the fully-open configuration (I.e., the thickness-to-chord ratio of the airfoil shape).

Another example of an alternative embodiment includes tabs 72 that are oriented to extend forward from stems 70. For yet another example, there can be only one electric stepper motor 80, although in such an embodiment, additional gears and/or linkages would be needed to reverse the direction of the rotation while keeping the same magnitude in order to move flaps 64B with respect to flaps 64A. For a further example, there are bushings (not shown) positioned between stems 70 and duct 50.

Discussion of Possible Embodiments

The following are non-exclusive descriptions of possible embodiments of the present invention.

A gas turbine engine according to an exemplary embodiment of this disclosure, among other possible things includes: a fan; a compressor downstream of the fan; a combustor downstream of the fan; a turbine downstream of the fan; a bypass duct downstream of the fan and radially outward of the compressor; a cooling system comprising: an inlet for receiving air from the bypass duct; an outlet for returning air to the bypass duct; a cooling duct extending between the inlet and the outlet; a heat exchanger positioned in the cooling duct; and a modulator positioned in the cooling duct, wherein the modulator includes a plurality of dividers extending parallel to each other and arranged across the duct, wherein each divider comprises: a first flap that is rotatable in a first direction about an axis; a second flap is rotatable in a second direction about the axis that is opposite from the first direction.

The gas turbine engine of the preceding paragraph can optionally include, additionally and/or alternatively, any one or more of the following features, configurations and/or additional components:

Wherein the fluid modulator is moveable between fully-open position and a partially-closed position; wherein a trailing edge of the first flap is in contact with a trailing edge of the second flap in the fully-open position; and wherein the trailing edge of the first flap is spaced apart from the trailing edge of the second flap in the partially-closed position.

Wherein the first flap includes a first knuckle and first leaf extending downstream from the first knuckle; the second flap includes a second knuckle and a second leaf extending downstream from the second knuckle; and each divider further comprises a pin extending through the first and second knuckles, the pin providing an axis of rotation for the first and second flaps.

Wherein the first flap and the second flap form an airfoil shape when the fluid modulator is in the fully-open position.

Wherein the first flap includes a first stem that extends through the bypass duct.

Wherein the first stem is connected to a first tab that extends away from the first stem.

Wherein the first tab is rotatably connected to a first linkage.

Wherein the first linkage is rotatably connected to a second tab.

Wherein the second tab is connected to a first shaft of a first motor such that the first motor controls the position of the first flap.

Wherein the second flap includes a second stem that extends through the bypass duct on a side that is opposite of the first stem; the second stem is connected to a third tab that extends away from the second stem; the third tab is rotatably connected to a second linkage; the second linkage is rotatably connected to a fourth tab; and the fourth tab is connected to a second shaft of a second motor such that the second motor controls the position of the second flap.

Wherein the inlet is located on an inner wall of the bypass duct.

Wherein the outlet is located on an inner wall of the bypass duct, downstream of the inlet.

Wherein the air in the bypass duct travels generally axially when the fluid modulator is in the partially-closed position.

A fluid modulator according to an exemplary embodiment of this disclosure, among other possible things includes: a plurality of dividers extending parallel to each other and arranged across a duct, wherein each divider comprises: a first flap including a first knuckle and first leaf extending downstream from the first knuckle; a second flap including a second knuckle and a second leaf extending downstream from the second knuckle; and a pin extending through the first and second knuckles, the pin providing an axis of rotation for the first and second flaps;

The fluid modulator of the preceding paragraph can optionally include, additionally and/or alternatively, any one or more of the following features, configurations and/or additional components:

Wherein the fluid modulator is moveable between a fully-open position and a partially-closed position; wherein a trailing edge of the first leaf is in contact with a trailing edge of the second leaf in the fully-open position; and wherein the trailing edge of the first leaf is spaced apart from the trailing edge of the second leaf in the partially-closed positioned.

Wherein the first flap and the second flap form an airfoil shape when the fluid modulator is in the fully-open position Wherein the first flap includes a first stem that extends through the duct, and the second flap includes a second stem that extends through the duct on an opposite side from the first stem.

Wherein the first stem is connected to a first tab that extends away from the axis of rotation, and the second stem is connected to a second tab that extends away from the axis of rotation.

Wherein the pin is connected to one of the first tab and the second tab.

Wherein the first tab is rotatably connected to a first linkage, and the second tab is rotatably connected to a second linkage.

Wherein the first linkage is rotatably connected to a third tab, and the second linkage is rotatably connected to a fourth tab.

Wherein the third tab is connected to a first shaft of a first motor such that the first motor controls the position of the first flap, and the fourth tab is connected to a second shaft of a second motor such that the second motor controls the position of the second flap.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine comprising:
a fan;
a compressor downstream of the fan;
a combustor downstream of the fan;
a turbine downstream of the fan;
a bypass duct downstream of the fan and radially outward of the compressor;
a cooling system comprising:
   an inlet for receiving air from the bypass duct;
   an outlet for returning the air to the bypass duct;
   a cooling duct extending between the inlet and the outlet;
   a heat exchanger positioned in the cooling duct; and
   a fluid modulator positioned in the cooling duct, wherein the fluid modulator includes a plurality of dividers extending parallel to each other and arranged across the cooling duct, wherein each divider comprises:
      a first flap that is rotatable about an axis;
      a second flap that is rotatable about the axis;
      a first actuator, comprised of a first motor and a first linkage, wherein the first actuator is disposed to rotate the first flap; and
      a second actuator, comprised of a second motor and a second linkage, wherein the second actuator is disposed to rotate the second flap;
      wherein the first actuator and the second actuator are mechanically independent.

2. The gas turbine engine of claim 1, wherein the fluid modulator is moveable between a fully-open position and a partially-closed position:
   wherein a trailing edge of the first flap is in contact with a trailing edge of the second flap in the fully-open position; and
   wherein the trailing edge of the first flap is spaced apart from the trailing edge of the second flap in the partially-closed position.

3. The gas turbine engine of claim 1, wherein the first flap and the second flap form an airfoil shape when the fluid modulator is in the fully-open position.

4. The gas turbine engine of claim 1, wherein:
   the first flap includes a first knuckle and first leaf extending downstream from the first knuckle;
   the second flap includes a second knuckle and a second leaf extending downstream from the second knuckle; and
   each divider further comprises a pin extending through the first and second knuckles, the pin providing an axis of rotation for the first and second flaps.

5. The gas turbine engine of claim 1, wherein the first flap includes a first stem that extends through the bypass duct, and the second flap includes a second stem that extends through the bypass duct on a side that is opposite of the first stem.

6. The gas turbine engine of claim 5, wherein the first stem is connected to a first tab that extends away from the first stem, and the second stem is connected to a second tab that extends away from the second stem.

7. The gas turbine engine of claim 6, wherein the first tab is rotatably connected to the first linkage, and the second tab is rotatably connected to the second linkage.

8. The gas turbine engine of claim 7, wherein the first linkage is rotatably connected to a third tab, and the second linkage is rotatably connected to a fourth tab.

9. The gas turbine engine of claim 8, wherein the third tab is connected to a first shaft of the first motor.

10. The gas turbine engine of claim 9, wherein the fourth tab is connected to a second shaft of the second motor.

11. The gas turbine engine of claim 1, wherein the inlet is located on an inner wall of the bypass duct and the outlet is located on an inner wall of the bypass duct, downstream of the inlet.

12. The gas turbine engine of claim 1, wherein the air in the bypass duct travels generally axially when the fluid modulator is in a partially-closed position.

13. A fluid modulator comprising a plurality of dividers extending parallel to each other and arranged across a duct, wherein each divider comprises:
   a first flap including a first knuckle and first leaf extending downstream from the first knuckle;

a second flap including a second knuckle and a second leaf extending downstream from the second knuckle;

a pin extending through the first and second knuckles, the pin providing an axis of rotation for the first and second flaps, a first actuator comprised of a first motor and a first linkage, wherein the first actuator is disposed to rotate the first flap; and a second actuator comprised of a second motor and a second linkage, wherein the second actuator is disposed to rotate the second flap;

wherein the first actuator and the second actuator are mechanically independent.

14. The fluid modulator of claim 13, wherein the fluid modulator is moveable between a fully-open position and a partially-closed position:

wherein a trailing edge of the first flap is in contact with a trailing edge of the second flap in the fully-open position; and wherein the trailing edge of the first flap is spaced apart from the trailing edge of the second flap in the partially-closed position.

15. The fluid modulator of claim 14, wherein the first flap and the second flap form an airfoil shape when the fluid modulator is in the fully-open position.

16. The fluid modulator of claim 13, wherein the first flap includes a first stem that extends through the duct, and the second flap includes a second stem that extends through the duct on an opposite side from the first stem.

17. The fluid modulator of claim 16, wherein the first stem is connected to a first tab that extends away from the axis of rotation, and the second stem is connected to a second tab that extends away from the axis of rotation.

18. The fluid modulator of claim 17, wherein the pin is connected to one of the first tab and the second tab.

19. The fluid modulator of claim 17, wherein:

the first tab is rotatably connected to the first linkage, and the second tab is rotatably connected to the second linkage; and the first linkage is rotatably connected to a third tab, and the second linkage is rotatably connected to a fourth tab.

20. The fluid modulator of claim 19, wherein the third tab is connected to a first shaft of the first motor and the fourth tab is connected to a second shaft of the second motor.

* * * * *